United States Patent [19]

Yoshimura et al.

[11] Patent Number: 4,521,596
[45] Date of Patent: Jun. 4, 1985

[54] FLUORORESIN-CONTAINING COATING COMPOSITION

[75] Inventors: Tatsushiro Yoshimura; Shigetake Tominaga, both of Osaka, Japan

[73] Assignee: Daikin Kogyo Co., Ltd., Osaka, Japan

[21] Appl. No.: 423,189

[22] Filed: Sep. 24, 1982

[30] Foreign Application Priority Data

Sep. 28, 1981 [JP] Japan .................... 56-154180

[51] Int. Cl.$^3$ .............................................. C08K 3/10
[52] U.S. Cl. .................... 524/406; 524/415; 524/417; 524/428; 524/492; 523/101
[58] Field of Search ............ 523/101; 524/406, 415, 524/417, 428, 492

[56] References Cited

U.S. PATENT DOCUMENTS 4,017,315  4/1977  Vukasovich et al. ............ 524/406
4,021,395  5/1977  Vary ................................ 523/101
4,150,008  4/1979  Vassiliou et al. ................ 523/101

*Primary Examiner*—Joseph L. Schofer
*Assistant Examiner*—N. Sarofim
*Attorney, Agent, or Firm*—Birch, Stewart, Kolasch & Birch

[57] ABSTRACT

An aqueous coating composition comprising a fluororesin, and (a) molybdic acid or its salt, (b) phosphoric acid or its salt, (c) ammonium hydroxide and (d) colloidal silica, the weight ratio of the fluororesin to the total amount of the ingredients (a), (b), (c) and (d) being 90:10 to 20:80 and the molar ratio of (a) molybdic acid or its salt as converted to $MoO_3$, (b) phosphoric acid or its salt as converted to orthophosphoric acid, (c) ammonium hydroxide and (d) colloidal silica being 1:1:1:1 to 1:20:15:20 has good adhesivity, good corrosion resistance and heat resistance without exerting any toxicity and causing any pollution problem.

10 Claims, No Drawings

FLUORORESIN-CONTAINING COATING COMPOSITION

This invention relates to a fluororesin-containing coating composition. More particularly, it relates to an aqueous fluororesin-containing coating composition having good adhesiveness, good corrosion resistance and heat resistance without exerting any toxicity and causing any pollution problem.

A fluororesin is used as a coating of a substrate to be used in chemical, electrical, mechanical and food industries and also as a coating of domestic housewares such as a frying pan and an iron, since it has good heat and chemical resistance and other excellent properties such as low friction coefficient and non-stickness.

The non-stickness of the fluororesin, however, leads to its poor adhesiveness on any substrate and requires particular methods for preparing the coating and for applying it on the substrate in order to give satisfactory adhesiveness even under severe conditions.

Various binders which are blended with a dispersion of the fluororesin to improve its adhesiveness have been proposed. Among them, chromic acid and a mixture of chromic acid and phosphoric acid are most widely used. However, when an article coated with a fluororesin-containing coating composition which comprises the chromium-containing binders is used in boiling water or in contact with hot oil at a temperature of higher than 200° C., the coated film is entirely peeled off or it develops spot-like or foam-like peeling, so-called "blister". Further, such composition pollutes production and working environments and has problems in the course of the treatment of wastes, since the binders have strong acidity.

Also, many binders which do not comprise chromic acid such as a polyarylenesulphide base assistant, a polyamideimide base assistant and an organic titanium compound base assistant were proposed (British Pat. No. 1,592,886, U.S. Pat. Nos. 4,011,361, 4,016,125, 4,070,525 and 4,022,742). However, a fluororesin-containing primer blended with such non-chromium binders is poor in adhesiveness on an iron substrate and heat resistance. For example, when the primer is coated on a big substrate such as a big drum, it takes long time to heat the substrate, and the coated primer is exposed to a high temperature for a long time. It also takes a long time to cool the big substrate, and the coated primer is again exposed to a high temperature for a long time. When a baked resin lining is formed, it is necessary to bake the resin for a long time in order to smooth the surface. As described above, the fluororesin-containing coating is often exposed to a high temperature of, for example, 350° to 380° C. for a long period of, for example, 10 to 20 hours, but any non-chromium primer composition cannot resist such high temperature treatment. Further, although a conventional primer which is baked for a short time has minimum bond strength, when the primer film on the iron substrate formed by baking it for a short time is exposed to a high temperature steam or hot water for a long time, blisters form, or if no blister form, its adhesiveness tends to deteriorate. Therefore, when the primer is applied on the substrate as an undercoating for a corrosion-resistant lining, the coating film is easily peeled off.

Alternatively, it is proposed to blend molybdic acid or its salt in the fluororesin-containing coating composition in order to improve its properties. For example, Japanese Patent Publication (unexamined) No. 142732/1977 discloses an antistatic coating comprising a fluororesin-containing coating blended with molybdic acid or its salt. Japanese Patent Publication (unexamined) Nos. 104363/1980 and 106268/1980 disclose a fluororesin-containing coating composition which contains a molybdate and phosphoric acid to prevent the deterioration of the fluororesin on a copper substrate. However, these coating compositions do not have sufficiently improved adhesiveness.

As a result of an extensive study, it has now been found that addition of molybdic acid or its salt, phosphoric acid or its salt, ammonium hydroxide and silica in a specified ratio in a fluororesin-containing coating composition greatly improves adhesiveness of the coating film formed from the composition on a substrate.

According to the present invention, there is provided an aqueous coating composition comprising a fluororesin, and (a) molybdic acid or its salt, (b) phosphoric acid or its salt, (c) ammonium hydroxide and (d) colloidal silica, the weight ratio of the fluororesin to the total amount of the ingredients (a), (b), (c) and (d) being 90:10 to 20:80 and the molar ratio of (a) molybdic acid or its salt as converted to $MoO_3$, (b) phosphoric acid or its salt as converted to orthophosphoric acid, (c) ammonium hydroxide and (d) colloidal silica being 1:1:1:1 to 1:20:15:20.

The fluororesin coating film formed from the coating composition of the invention has good hardness and strong adhesiveness to any substrate including the iron substrate and also so good heat and corrosion resistance that it does not develop blisters and peeling when it is exposed to boiling water or heated oil for a long time. The coating composition of the invention does not contain chromic acid so that it does not pollute the working environment in which it is coated on the substrate, and is easily handled. In addition, it has been surprisingly found that the mixture of only the ingredients (a), (b), (c) and/or (d) forms a chemical film which has good corrosion resistance.

The coating composition of the invention is preferably used as a primer. The formed coating film has good adhesiveness to a coating film to be formed on it from a fluororesin-containing coating composition, and as a whole, they afford a strongly adhered film. The coating composition of the invention is used also as a single-layer coating which requires no top coating.

The specific examples of the fluororesin to be used in the invention are homo- or co-polymers of fluoroolefins (e.g. tetrafluoroethylene, hexafluoropropylene, chlorotrifluoroethylene, vinylidene fluoride, vinyl fluoride, etc.) and copolymers of such fluoroolefins with olefins (e.g. ethylene, propene, etc.) and/or fluorovinyl ether, which contains at least 75% by weight of fluoroolefins. Among them, polytetrafluoroethylene, polychlorotrifluoroethylene, tetrafluoroethylene/hexafluoropropylene copolymer, ethylene/chlorotrifluoroethylene copolymer, tetrafluoroethylene/fluorovinyl ether copolymer and ethylene/tetrafluoroethylene/fluorovinyl ether terpolymer are preferred. The particle size of the fluororesin is not more than about 50 μm and preferably from 0.1 to 50 μm, more preferably from 0.1 to 10 μm. The fluororesin dispersion prepared by emulsion polymerization is preferred since its particle size is usually in the range of from 0.1 to 3.0 μm so that the dispersion as such can be used in the preparation of the coating composition of the invention.

Specific examples of molybdic acid and its salt are molybdic anhydride, molybdic acid, pyromolybdic acid, ammonium molybdate, zinc molybdate, ammonium molybdophosphate and ammonium phosphomolybdate.

Preferred examples of phosphoric acid and its salt are orthophosphoric acid, metaphosphoric acid, pyrophosphoric acid and polyphosphoric acid and an ammonium salt, an alkali metal salt and a molybdenum salt thereof.

Ammonium hydroxide may be added in the aqueous medium in the form of aqueous ammonia or formed in situ by passing gaseous ammonia through the aqueous medium.

Colloidal silica is present in the form of an aqueous colloidal solution of silica, which is commercially available.

The amounts of these ingredients are essential in the invention, and they are used in the following proportions on the bases of molybdic acid or its salt.

Phosphoric acid is used in the amount of from 1 to 20 moles, preferably from 2 to 15 moles per 1 mole of molybdic acid or its salt as converted to $MoO_3$.

Ammonium hydroxide is used in the amount of from 1 to 15 moles, preferably from 2 to 10 moles per 1 mole of molybdic acid or its salt as converted to $MoO_3$.

Colloidal silical is used in the amount of from 1 to 20 moles, preferably from 3 to 15 moles per 1 mole of molybdic acid or its salt as converted to $MoO_3$.

In the coating composition of the invention, the weight ratio of the fluororesin to the total amount of the ingredients (a), (b), (c) and (d) is from 90:10 to 20:80, preferably from 70:30 to 30:70.

The concentration of the fluororesin in the whole composition is from 10 to 65% by weight, preferably from 15 to 45% by weight.

In addition to the above ingredients, the coating composition of the invention may further comprises a surfactant which enhances the dispersibility of the ingredients. Preferred surfactants are anionic surfactants such as sodium lauryl sulfate, sodium dodecylbenzene sulfate, etc. Nonionic or cationic surfactants are less preferred since they tend to cause coalescence of the composition.

The coating composition of the invention can be prepared by any conventional process. One typical procedure is as follows:

1. Dissolve molybdic acid or its salt in aqueous ammonia,
2. Add phosphoric acid or its salt in the solution obtained in the step 1, while stirring and cooling the solution,
3. After cooling, add an aqueous dispersion of collidal silica in the solution,
4. Combine the mixture obtained in the step 3 with an aqueous dispersion of the fluororesin and mix it well. This step is preferably carried out just before the coating composition is used in order to avoid the coagulation of the fluororesin.

The coating composition of the invention can be coated on a substrate made of, for example, aluminum and aluminum alloys as well as iron and iron alloys and affords a strong coating film.

The coating composition of the invention is coated on the substrate, surface of which has preferably been roughened by a conventional chemical and/or physical method and cleaned, by a conventional coating method such as brushing, spraying, dipping and casting. The amount of the coating composition is selected so as to obtain a coating film of from 5 to 30 μm in thickness after being baked. The coated composition is then dried by air-drying or heating at an elevated temperature, for example at 100° C. to evaporate water and volatile ingredients from the composition. After drying, the coating film should be baked at a temperature of higher than the melting point of the fluororesin. The baking temperature is, in case of polytetrafluoroethylene, from 340° to 400° C. Baking of the coating film is usually carried out by keeping the coated substrate in a oven at a temperature as described above for a period of from several minutes to several hours. After baking, the coated substrate is cooled slowly by allowing it to be cooled in air, or cooling it quickly by quenching in water.

When the coating composition of the invention is used as the primer, it is coated on the substrate once. Alternatively, when it is used not only as the primer but also as the surface coating, the above coating steps are repeated several times to obtain the coating film having enough thickness.

The surface coating (the topcoat) may be coated on the primer of the invention by any conventional method such as spraying or powder coating of the fluororesin-containing surface coating. Further, the topcoat is made by thermocompression bonding of a preformed fluororesin film on the primer. The fluororesin contained in the surface coating is not necessarily the same as contained in the primer, and can be selected according to the final use.

The present invention will be hereinafter explained in detail by following Examples, wherein part and % are by weight unless otherwise indicated.

EXAMPLE 1 AND COMPARATIVE EXAMPLES 1 AND 2

Molybdic anhydride ($MoO_3$) (16 parts) was dissolved in 28% aqueous ammonia (40 parts) diluted with water (50 parts), and then, 85% orthophosphoric acid (50 parts) was slowly added. After cooling, colloidal silica (Snowtex "O" sold by Nissan Chemical Industries, Ltd. Solid content: 20%) (100 parts) was added to obtain a mixture (hereinafter referred to as "Composition B-1"). The molar ratio of $MoO_3/H_3PO_4/NH_4OH/SiO_2$ in Composition B-1 was 1:3.9:2.9:3.

Composition B-1 and an aqueous dispersion of polytetrafluoroethylene (PTFE) (solid content: 55%, referred to as "Composition A-1") were mixed together in the predetermined weight ratio as shown in Table 1 to obtain the primer. The primer was spray coated on an iron plate (SS-41, 50 mm×100 mm×1.5 mm), the surface of which having been roughened by a mixture of emery Nos. 80 and 100 in the weight ratio of 1:1 and degreased by heating at 380° C. for 15 minutes. The primer coating was dried in an infrared dryer at 100° C. for 10 minutes and baked in an oven at 380° C. for 20 minutes.

On the formed primer coating film, a surface coating containing tetrafluoroethylene/hexafluoropropylene copolymer (Neoflon FEP powder coating NC-1539 manufactured by Daikin Kogyo Co., Ltd.) was electrostatically coated to the thickness of 1 mm and baked in the oven at 350° C. for 5 hours to obtain a lining sample.

The lining film was cut into strips of 100 mm wide. The 180° peeling test was carried out by means of an autograph "Shimadzu IS-500" under the following conditions:

Peeling rate: 50 mm/min.

Peeled width: 10 mm
Temperature : 20°-25° C.

In the same manner as above but using a commercially available primer, a lining sample was prepared, and its peeling strength was measured.

The results are shown in Table 1.

TABLE 1

|  | Primer Comp. A-1/Comp. B-1 (wt./wt.) | Peeling strength (Kg/cm) |
|---|---|---|
| Example 1 | 10/12 | 5–6.5 |
|  | 10/17 | 6–6.5 |
|  | 10/20 | 6–7 |
|  | 10/23 | 6.5–7 |
|  | 10/28 | 2.5–3.5 |
| Comparative Example 1 | Polyflon enamel EK-1883GB*[1] | 1–2 |
| Comparative Example 2 | Polyflon enamel EK-1783GB*[2] | 1–1.5 |

Note:
[1]Manufactured by Daikin Kogyo Co., Ltd. Chief ingredients: PTFE and polyimide resin
[2]Manufactured by Daikin Kogyo Co., Ltd. Chief ingredients: PTFE and organic titanium complex

EXAMPLE 2 AND COMPARATIVE EXAMPLES 3 AND 4

Ammonium molybdate (($NH_4$)$_6$Mo$_7$O$_{24}$.4$H_2$O) (20 parts) was dissolved in 28% aqueous ammonia (30 parts) diluted with water (60 parts), and then 85% orthophosphoric acid (50 parts) was slowly added. After cooling, colloidal silica (Snowtex "OL" sold by Nissan Chemical Industries, Ltd. Solid content: 20%) (130 parts) was added to obtain a mixture (hereinafter referred to as "Composition B-2"). The molar ratio of $MoO_3$/$H_3PO_4$/$NH_4OH$/$SiO_2$ in Composition B-2 was 1:3.8:2.1:3.8.

Composition B-2 and Composition A-1 as prepared in Example 1 were mixed together in the predetermined weight ratio as shown in Table 2 to obtain the primer. Then, the primer was coated on the iron plate, dried and baked in the same manner as in Example 1.

On the formed primer coating film, as a surface coating, a fluororesin enamel (Polyflon enamel EK-4108GY manufactured by Daikin Kogyo Co., Ltd. PTFE solid content: 41%) was spray coated to the thickness of 15 to 20 μm after being baked, dried in an infrared dryer at 100° C. for 15 minutes and baked in an oven at 380° C. for 20 minutes or 5 hours to obtain a fluororesin coating film.

In the same manner as above but using a commercially available primer, a coating film was prepared.

According to the methods of JIS (Japanese Industrial Standard) K 6894, pencil hardness test and drawing pin test were carried out .

The results are shown in Table 2.

TABLE 2

|  | Primer | Film Properties | | | |
|---|---|---|---|---|---|
|  |  | Baking (20 min.) | | Baking (5 hr.) | |
|  | Comp. A-1/ Comp. B-2 (wt./wt.) | Pencil hardness | Drawing pin test | Pencil hardness | Drawing pin test |
| Example 2 | 1/1 | H | 5 | H | 5 |
|  | 2/3 | H-2H | 5 | H-2H | 5 |
|  | 2/4 | H-2H | 5 | H-2H | 5 |
|  | 1/4 | H | 4.5 | H | 4.5 |
| Comparative Example 3 | Polyflon enamel EK-1883GB*[1] | H | 5 | HB | 3 |
| Comparative Example 4 | Polyflon enamel EK-1783GB*[2] | H | 4.5 | HB | 2.5 |

Note:
[1]See Note 1 in Table 1
[2]See Note 2 in Table 1

EXAMPLE 3 AND COMPARATIVE EXAMPLES 5 TO 8

Ammonium molybdophosphate (($NH_4$)$_3$PO$_4$.1-2MoO$_3$.3$H_2$O) (20 parts) was added to 28% aqueous ammonia (75 parts) diluted with water (30 parts), and then, 85% orthophosphoric acid (85 parts) was slowly added. After cooling, colloidal silica (Snowtex "C" sold by Nissan Chemical Industries, Ltd.) (160 parts) was added to obtain a mixture (hereinafter referred to as "Composition B-3"). The molar ratio of $MoO_3$/$H_3PO_4$/$NH_4OH$/$SiO_2$ in Composition B-3 was 1:5.9:4.8:4.3.

Composition B-3 was added to a FEP dispersion (Neoflon ND-1 manufactured by Daikin Kogyo Co., Ltd, solid content: 52%, hereinafter referred to as "Composition A-2") in the predetermined weight ratio as shown in Table 3 and coated on an iron plate in the same manner as in Example 1 to obtain a primer coating film. Then, the FEP powdery surface coating was coated on the primer coating film with the thickness of 1 mm in the same manner as in Example 1. The peeling strength of the resulting film was measured following the same method as in Example 1.

The lining sample cut into the strips of 10 mm wide was immersed in hot water at 95° to 98° C. for 300 hours and examined for peeling strength.

In the same manner as above but using a commercially available primer, the same test as above was carried out.

The results are shown in Table 3.

TABLE 3

|  | Primer Comp. A-2/ Comp. B-3 (wt./wt.) | Peeling Strength (kg/cm) | |
|---|---|---|---|
|  |  | Before hot water treatment | After hot water treatment |
| Example 3 | 5/14 | 6.2–6.7 | 4–5.3 |
|  | 6/14 | 6–7 | 4–5 |
|  | 7/14 | 7–8 | 4–4.5 |
|  | 8/14 | 8–9 | 4–5 |
|  | 9/14 | 7–8 | 4–5 |
|  | 10/14 | 6–7 | 3–4 |
| Comparative Example 5 | Polyflon enamel EK-1883GB*[1] | 1–2 | Peeled off |
| Comparative Example 6 | Polyflon enamel EK-1783GB*[2] | 1–1.5 | Peeled off |
| Comparative Example 7 | Polyflon enamel EK-1083GB*[3] and EK-1883GB*[1] | 4–5 | 1–2 |
| Comparative Example 8 | Chromium- containing | 4–5 | 1.5–2 |

TABLE 3-continued

| Primer Comp. A-2/ Comp. B-3 (wt./wt.) | Peeling Strength (kg/cm) | |
| --- | --- | --- |
| | Before hot water treatment | After hot water treatment |
| primer*4 | | |

Note:
[1] See Note 1 in Table 1
[2] See Note 2 in Table 1
[3] Manufactured by Daikin Kogyo Co., Ltd. Chief ingredients: PTFE and polyarylenesulphide
[4] Manufactured by du Pont

EXAMPLES 4 TO 15 AND COMPARATIVE EXAMPLES 9 TO 11

Molybdic acid ($H_2MoO_4.H_2O$), 28% aqueous ammonia, 85% orthophosphoric acid, colloidal silica (Snowtex "O") and water in the predetermined molar ratio were mixed together to obtain a mixture (hereinafter referred to as "Composition B-4").

Composition B-4 and a PTFE dispersion (solid content: 50%, hereinafter referred to as "Composition A-3") were mixed together to obtain the primer.

The primer was coated on an iron plate in the same manner as in Example 1. On the primer coating film, a FEP powdery surface coating was coated to the thickness of 1 mm and examined for peeling strength in the same manner as in Example 1.

The results are shown in Table 4.

TABLE 4

| | Composition of ingredients (mole) | | | | | Primer Comp. A-3/Comp. B-4 (wt./wt.) | Peeling strength (kg/cm) |
| --- | --- | --- | --- | --- | --- | --- | --- |
| | Water | $H_2MoO_4.H_2O$ | $NH_4OH$ | $H_3PO_4$ | $SiO_2$ | | |
| Example 4 | 53 | 1 | 3 | 5 | 3.7 | 100/155 | 6-7 |
| Example 5 | 53 | 1 | 3 | 5 | 5.5 | 85/140 | 8-9 |
| Example 6 | 53 | 1 | 5 | 6 | 4.4 | 100/184 | 8-9 |
| Example 7 | 53 | 1 | 5 | 6 | 4.4 | 100/280 | 6-7 |
| Example 8 | 53 | 1 | 5 | 8 | 6 | 50/107 | 3-4 |
| Example 9 | 53 | 1 | 3 | 7 | 5.2 | 100/190 | 3-4 |
| Example 10 | 53 | 1 | 7 | 7 | 8 | 60/128 | 4 |
| Example 11 | 44 | 1 | 2.5 | 4 | 4.4 | 100/124 | 4-5.5 |
| Example 12 | 44 | 1 | 2.5 | 4 | 3.2 | 70/138 | 5-5.5 |
| Example 13 | 177 | 1 | 10 | 15 | 15 | 50/120 | 4.2-4.8 |
| Example 14 | 177 | 1 | 10 | 15 | 12 | 50/70 | 5-6 |
| Example 15 | 177 | 1 | 8 | 13 | 14 | 50/100 | 2-3 |
| Comparative Example 9 | 53 | 1 | 5 | 0.5 | 4.4 | 100/280 | 1-2 |
| Comparative Example 10 | 53 | 1 | 5 | 6 | 0.7 | 100/280 | 0.5-1 |
| Comparative Example 11 | 53 | 1 | 5 | 30 | 4.4 | 100/280 | 1-2 |

What is claimed is:

1. An aqueous coating composition comprising a fluororesin, and (a) molybdic acid or its salt, (b) phosphoric acid or its salt, (c) ammonium hydroxide and (d) colloidal silica, the weight ratio of the fluororesin to the total amount of the ingredients (a), (b), (c) and (d) being 90:10 to 20:80 and the molar ratio of (a) molybdic acid or its salt as converted to $MoO_3$, (b) phosphoric acid or its salt as converted to orthophosphoric acid, (c) ammonium hydroxide and (d) colloidal silica being 1:1:1:1 to 1:20:15:20.

2. The composition according to claim 1, which further comprises an anionic surfactant as a dispersing agent.

3. The composition according to claim 1, wherein the molybdic acid or its salt is one selected from the group consisting of molybdic anhydride, molybdic acid, pyromolybdic acid, ammonium molybdate, zinc molybdate, ammonium molybdophosphate and ammonium phosphomolybdate.

4. The composition according to claim 1, wherein the phosphoric acid is one selected from the group consisting of orthophosphoric acid, metaphosphoric acid, pyrophosphoric acid and polyphosphoric acid and an ammonium salt, an alkali metal salt and a molybdenum salt thereof.

5. The composition according to claim 1, wherein the molar ratio of ingredients (a), (b), (c) and (d) is from 1:2:2:3 to 1:15:10:15.

6. The coating composition according to claim 1, wherein the weight ratio of the fluororesin to the total amount of the ingredients (a), (b), (c) and (d) is from 70:30 to 30:70.

7. The coating composition according to claim 1, wherein the concentration of fluororesin in the composition is from 10 to 65% by weight.

8. The composition according to claim 1, wherein the concentration of fluororesin in the composition is from 15 to 45% by weight.

9. An aqueous coating composition comprising a fluororesin dispersion prepared by emulsion polymerization wherein the particle size of the fluororesin is from about 0.1 to 50 μm and wherein the concentration of fluororesin in the composition is from 10 to 65% by weight and (a) a water soluble molybdic acid or its salt, (b) a water soluble phosphoric acid or its salt, (c) ammonium hydroxide and (d) colloidal silica, the weight ratio of the fluororesin to the total amount of the ingredients (a), (b), (c) and (d) being 90:10 to 20:80 and the molar ratio of (a) molybdic acid or its salt as converted to $MoO_3$, (b) phosphoric acid or its salt as converted to orthophosphoric acid, (c) ammonium hydroxide and (d) colloidal silica being 1:1:1:1 to 1:20:15:20.

10. The composition according to claim 9, wherein the particle size of the fluororesin is in the range of from 0.1 to 3.0 μm.

* * * * *